UNITED STATES PATENT OFFICE.

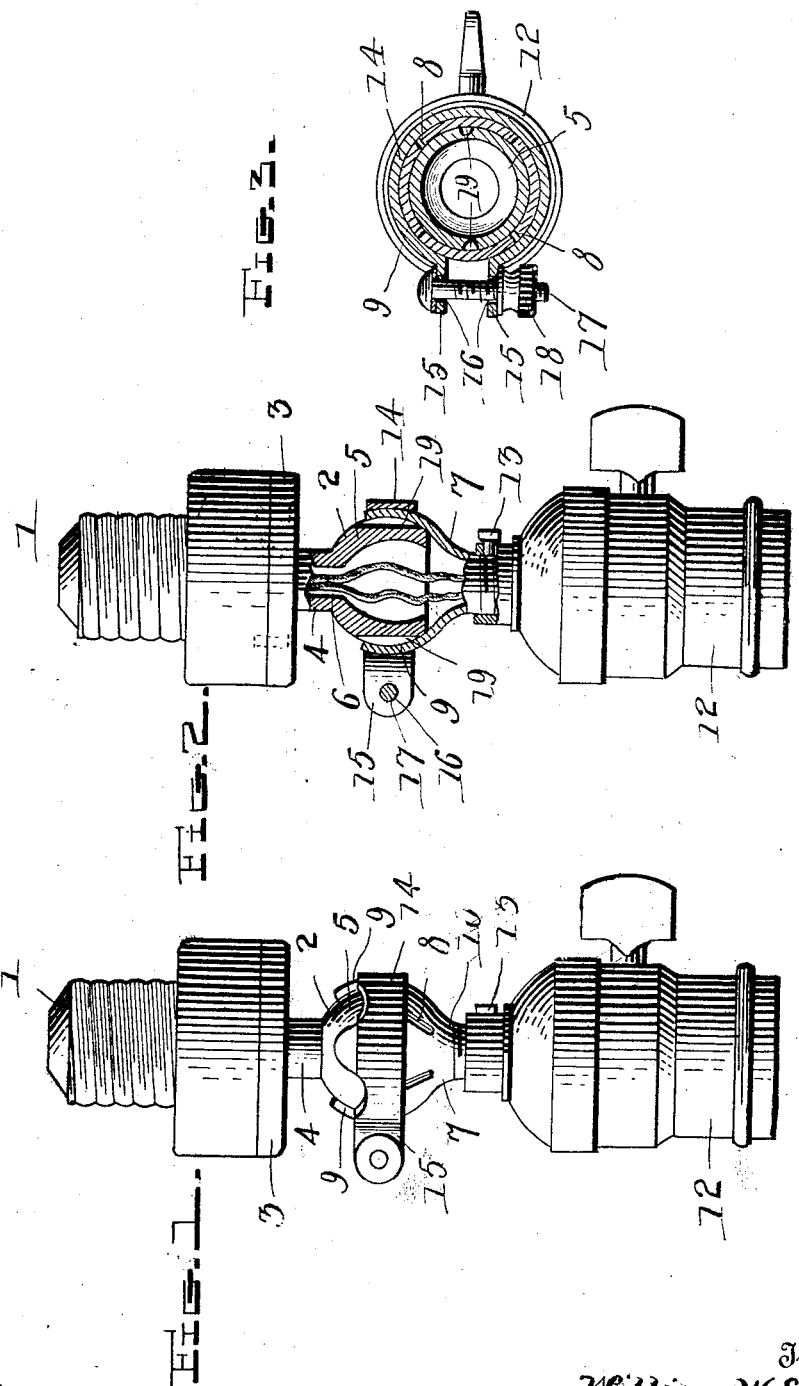

WILLIAM W. SNOWHILL, OF SPOTSWOOD, NEW JERSEY, ASSIGNOR OF ONE-HALF TO LOUIS WOLFSON, OF NEW BRUNSWICK, NEW JERSEY.

LAMP-BRACKET.

No. 823,000.  Specification of Letters Patent.  Patented June 12, 1906.

Application filed March 22, 1906. Serial No. 307,519.

*To all whom it may concern:*

Be it known that I, WILLIAM W. SNOWHILL, a citizen of the United States, residing at Spotswood, in the county of Middlesex and State of New Jersey, have invented certain new and useful Improvements in Lamp-Brackets; and I do declare the following to be a full, clear, and exact description of the invention, such as will enable others skilled in the art to which it appertains to make and use the same.

This invention relates to improvements in adjustable supporting-brackets for incandescent lamps.

The object of the invention is to provide a supporting-bracket for lamps of this character by means of which the lamp may be supported at any desired angle.

A further object is to provide an adjustable bracket or universal connection of this character which will be simple, strong, and durable in construction, efficient in operation, and well adapted to the purpose for which it is designed.

With the above and other objects in view the invention consists of certain novel features of construction, combination, and arrangement of parts, as will be hereinafter described and claimed.

In the accompanying drawings, Figure 1 is a side view of the plug and lamp-socket, showing the improved bracket or universal connection between the same. Fig. 2 is a similar view, partly in section; and Fig. 3 is a transverse sectional view taken through the ball and socket of the connection on the line with the clamping mechanism for the socket.

Referring more particularly to the drawings, 1 denotes an ordinary porcelain plug by which connection is made to the supply-wires. Secured to the outer side of the plug 1 is the ball member 2 of the improved bracket or universal connection. The member 2 consists of a base portion, which is here shown in the form of a circular disk 3, having projecting from its outer side an integrally-formed neck 4, on the outer end of which is formed a ball 5. The member 2 is provided with a longitudinal centrally-disposed aperture or bore 6, through which conducting-wires from the plug 1 are adapted to pass. The member 2 may be formed of any suitable non-conducting material, but is preferably formed of porcelain and is attached to the plug 1 by screws or other suitable fastening devices, as shown.

The socket member of the device consists of a cup or socket portion 7, the outer edge of which is preferably scalloped, as shown, and between each of said scallops the socket is split or cut, as shown at 8, thereby forming a series of yieldable or spring sections 9, adapted to embrace the ball 5 when the same is inserted therein. The opposite end of the socket-section is provided with a tubular extension 10, which is threaded on its outer side and is adapted to be screwed into the upper end of a lamp-socket 12, as shown. Said tubular extension is held against unscrewing by means of a set-screw 13.

Arranged around the upper scalloped ends of the spring-sections 9 and preferably secured to one of said sections is a clamping-band 14, the ends of which are bent laterally to form outwardly-projecting parallel lugs 15, provided with alined apertures 16. Through the apertures 16 is inserted a screw 17 to receive a clamping-nut 18, by means of which the ends of the band are drawn together, thereby clamping the sections 9 into more or less tight engagement with the ball 5, thus providing for the supporting of the lamp-socket and lamp at any desired angle and in any desired position.

The inner sides of the spring-sections 9 are curved or hollowed out to fit the surface of the ball 5, the outer scalloped ends of said sections projecting beyond the center of the ball, so that when the clamping-nut is screwed up and the sections 9 drawn into close engagement with the ball said parts will be secured together to permit of the universal movement of the lamp-socket, which after being turned to the desired angle is held therein by means of the clamping-band and clamping screw and nut, which draw the sections 9 into tight frictional engagement with the ball, as hereinbefore described. In order that a more rigid engagement may be effected between the spring-sections 9 and the ball 5, the latter is provided with two or more notches 19, with which the spring-sections will be engaged when drawn in by the clamping-band, thus affording a more effectual grip for said spring-sections.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claim.

Having thus described my invention, what I claim as new, and desire to secure by Letters Patent, is—

A lamp-bracket of the character described comprising a ball member, having a flanged attaching-base, a grooved ball, an integrally-formed neck connecting said ball and base, a socket member having spring ball-engaging sections, a clamping-band arranged around said sections, apertured, parallel, laterally-projecting lugs formed on the ends of said clamping-band, a clamping bolt and nut arranged in said apertured lugs to draw said band and the spring-sections of the socket into close frictional engagement with the ball and the grooves therein, and an exteriorly-threaded tubular extension formed on the outer end of the socket section, whereby the latter is connected with a lamp-socket, said ball-section having a central longitudinally-disposed passage communicating with said tubular extension of the socket to permit the passage of circuit-wires, substantially as described.

In testimony whereof I have hereunto set my hand in presence of two subscribing witnesses.

WILLIAM W. SNOWHILL. [L. S.]

Witnesses:
  MICHAEL O'CONNOR,
  CHAS. O'CONNOR.